United States Patent [19]
Palazzetti

[11] 3,942,045
[45] Mar. 2, 1976

[54] SPEED OR ANGULAR POSITION ELECTROMAGNETIC TRANSDUCER

[75] Inventor: Mario Palazzetti, Avigliana (Turin), Italy

[73] Assignee: Fiat Societa per Azioni, Turin, Italy

[22] Filed: June 5, 1974

[21] Appl. No.: 476,495

[52] U.S. Cl. ............... 310/155; 310/168; 310/111; 324/174
[51] Int. Cl.² ........................................ H02K 21/38
[58] Field of Search ........... 310/155, 154, 111, 168, 310/13; 324/174

[56] References Cited
UNITED STATES PATENTS

| | | | |
|---|---|---|---|
| 2,419,301 | 4/1947 | Tragesser | 310/155 |
| 3,492,518 | 1/1970 | Wayne | 310/155 |
| 3,531,671 | 9/1970 | Höhne | 310/168 |
| 3,681,630 | 8/1972 | Sutton | 310/13 X |

*Primary Examiner*—Donovan F. Duggan
*Attorney, Agent, or Firm*—Sughrue, Rothwell, Mion, Zinn & Macpeak

[57] ABSTRACT

An electromagnetic angular speed or angular position transducer comprises a permanent magnet with closely spaced pole faces and a ferromagnetic core magnetically connected to the magnet and carrying a coil. The transducer cooperates with a toothed wheel the teeth of which are moved past the pole faces and the core in such a way that two magnetic circuits are completed by the teeth, one passing through the teeth and the two pole faces, and the other passing through the teeth and the core. The two magnetic circuits are in parallel with one another and the reluctance of each changes as the teeth move therepast. The circuit through the two pole faces ensures that the magnet is operated with a high leakage flux so that small changes in the reluctance cause relatively large flux changes and thus a relatively high electromotive force in the coil wound about the core.

1 Claim, 10 Drawing Figures

SPEED OR ANGULAR POSITION ELECTROMAGNETIC TRANSDUCER

BACKGROUND OF THE INVENTION

In the present state of the art known electromagnetic transducers comprise a permanent magnet connected to a fixed structure and magnetically interacting with a rotating toothed wheel fixed to the member the speed of rotation of which, with respect to the fixed structure, is to be measured. As is well known, variation in the magnetic flux ($d\phi$) caused as the teeth pass in proximity to the permanent magnet, induces in a coil wound about a part of the magnet an electromotive force proportional to $d\phi/dt$, where t is the time. In known transducers a coil is wound on the permanent magnet or on an iron core forming part of a magnetic circuit including the magnet. Normally the current induced in the coil is sinusoidal and, by means of a simple frequency-voltage converter circuit a signal the amplitude of which is proportional to the speed of rotation of the toothed wheel is obtained.

In general the permanent magnets used in known devices described above are, effectively, magnetic flux generators in that their poles are well spaced and do not form part of a closed magnetic circuit, thus creating very little leakage flux. Therefore small pole faces are adequate as the magnetic flux across the faces is small. In fact the permanent magnets are operated in the region of their hysteresis cycle close to the remanence point; bearing in mind the shape of the magnetisation curve in the fourth quadrant of the well known hysteresis diagram which results when H is plotted against B (H magnetic field, B magnetic induction) it follows from this that in order to obtain adequate variation of B to create sufficient flux change to excite the coil in order to generate a detectable voltage signal, it is necessary to cause a considerable variation of H. In practical terms this means that it is necessary to maintain a very small and constant distance during rotation between the teeth of the wheel and the magnet. This requires an almost impossibly perfect adjustment and frequent inspection of the parts subject to play and/or misalignment due to wear of mountings and bearings. In fact even the smallest variation of the relative positions of the movable toothed wheel and the fixed magnetic circuit can induce a variation of magnetic flux sufficient to cause an induced electromotive force which would noticeably affect the output signal, hence introducing a considerable error into the operation of the transducer.

OBJECTS OF THE INVENTION

It is the main object of this invention to provide a transducer in which the above mentioned disadvantages of prior art angular velocity or angular position transducers are eliminated.

Another object of the invention is to achieve an electromagnetic angular speed transducer in which a very small variation in the magnetic field is sufficient to produce a high variation of flux and hence a large electromotive force so that the transducer operation is not dependent on a very closely maintained separation from the toothed wheel.

SUMMARY OF THE INVENTION

The electromagnetic transducer according to the invention comprises means defining a permanent magnetic circuit, including permanent magnet means having two pole faces positioned so that a toothed wheel which is relatively rotatable with respect to said permanent magnet means completes said magnetic circuit when positioned adjacent said pole faces whereby relative movement between the teeth of said toothed wheel and said pole faces causes regular changes to the reluctance of said magnetic circuit, a coil wound on to said permanent magnet means in which an electric current is induced by flux changes resulting from said changes in reluctance upon relative movement of said pole faces and said teeth of said toothed wheel, and the improvement wherein, said coil is wound on a core forming part of said magnetic circuit of said permanent magnet, and said pole faces are positioned with respect to one another whereby said magnetic circuit means and said pole faces form part of a first closed magnetic circuit which can be completed by said toothed wheel, and said core on which said coil is wound forms part of a second closed magnetic circuit which can be completed by said toothed wheel whereby both said circuits experience reluctance changes upon relative movement of said toothed wheel and said magnetic circuit means, said first and second closed magnetic circuits being in parallel with one another.

Further features of the invention will become apparent from the following description with reference to the accompanying drawings, which are provided purely by way of non-restrictive example.

DESCRIPTION OF THE PREFERRED EMBODIMENTS

Figure 1:
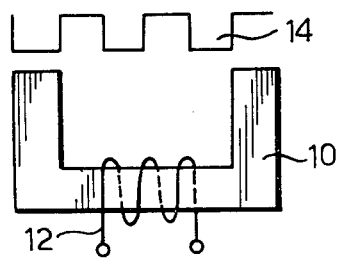
FIG. 1 is a diagrammatic illustration of an electromagnetic angular speed transducer of known type.

In the angular speed transducer of known type illustrated in FIG. 1, 10 is a permanent magnet, 12 a winding around a part of the magnet 10, in which an electromotive force is induced, and 14 is a toothed wheel fixed to a rotating member, (not shown) the angular speed of which it is desired to measure.

Figure 2:
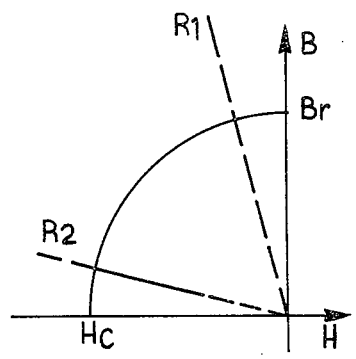
FIG. 2 is a part of a hysteresis diagram illustrating the variation of the magnetic induction B with changes to the magnetic field H for a permanent magnet.
Figure 3:
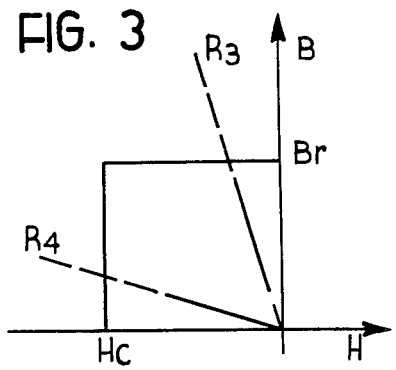
FIG. 3 is a part of an idealised hysteresis diagram of a permanent magnet.
Figure 4:
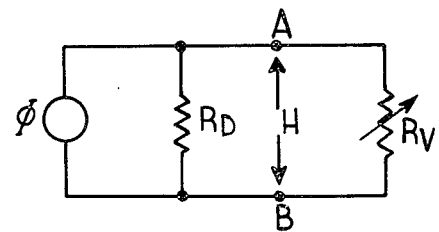
FIG. 4 illustrates an equivalent circuit for the transducer of FIG. 1.

Referring now to the diagram relating magnetic field H to the magnetic induction B of an actual magnet (FIG. 2) and comparing this with the corresponding diagram for an ideal magnet, shown in FIG. 3, it is known that during operation of a device of the type described the changes to magnetic field and magnetic induction take place along the line R1 in the case of a practical magnet and would take place along the line R3 if the magnet were an ideal one. That is in both cases the operating point will be in the neighbourhood of the remanence point Br. The equivalent circuit of the transducer is substantially as illustrated in FIG. 4. The equivalences adopted are:

flux generator $\phi$ — permanent magnet;

resistance $R_D$ — leakage reluctance of the magnetic circuit;

resistance Rv — variable reluctance of the magnetic circuit.

In electromagnetic angular speed transducers of known type, therefore, the resistance $R_D$ has a very high value and at the terminals A, B of the magnetic circuit there is, effectively, a flux generator. Now, the output signal from the coil 12 is representative of the variation in magnetic flux and the quantity which varies during rotation of the wheel 14 is the magnetic reluctance; but to a given variation of H there corresponds only a small variation of B, and thus only a small variation of the flux. It will be noted that the relationship linking the induced current i, the reluctance R and the flux $\phi$ is:

$$Ni = R\phi$$

where
N = number of turns.

Thus Ni is proportional to the magnetic field H.

Of course if the permanent magnet had ideal hysteresis as shown in FIG. 3 than at this value of B and H a variation of the field would not cause any flux variation and therefore there would be no electromotive force in the coil. Thus it will be appreciated that it would be expedient to work in the region of the hysteresis diagrams along the lines indicated R2 and R4 so that to a given variation of the field H there corresponds a relatively large variation of induction B and hence there will be a high flux change and a large electromotive force at the coil terminals.

Figure 5:
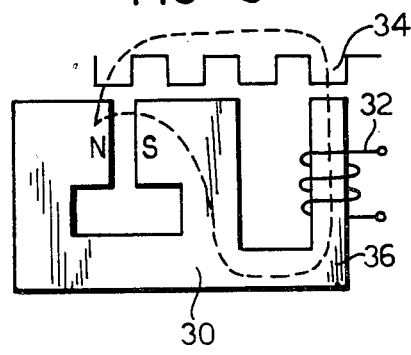
FIG. 5 illustrates diagrammatically one embodiment of an electromagnetic angular speed transducer according to the invention.

Referring now to FIG. 5 the transducer according to the invention shown diagrammatically, comprises a horseshoe permanent magnet with its pole ends N, S facing one another and to this magnet is attached a core 36 of ferromagnetic material on which is wound a coil 32; a rotatable toothed wheel 34 interacts magnetically with the magnet and core to complete two magnetic circuits.

As the toothed wheel 34 rotates close to the magnet 30 it is put almost into short circuit, that is a magnetic circuit across the poles NS is completed by the teeth of the wheel 34 so that there is a high leakage flux: the equivalent circuit of the transducer can be represented by the same circuit as that illustrated in FIG. 4 but the value of the leakage resistance (reluctance) $R_D$ is much lower (there being a high leakage flux) and the magnet 30 therefore acts as a magnetic field generator at the terminals A, B of the equivalent circuit; the variations in the reluctance $R_r$ caused by the passage of the wheel teeth thus induces a variation in the flux $\phi$. The line C indicates the closed magnetic circuit of the core 36 which is in parallel to the main magnetic circuit of the magnet, which crosses between the poles N, S. By operating the magnet in the regions of the hysteresis curve indicated by the lines $R_2$ and $R_4$ a large flux variation is obtained from a given change in reluctance. The conditions for operation of this type are that the permanent magnets used should have a high remanence B $_r$ and a large face, so as to have a large flux. Both of these conditions involve high quality magnets of high cost and a large bulk. Preferred embodiments of the invention are constructed, however, in slightly more complicated form but can be made less costly and less bulky. The characteristics of magnetic circuits suitable for transducers according to the invention are: a high leakage flux which is not linked with the coil, a high magnetic flux (obtained by using large surface permanent magnets) so that operation of the transducer does not require all available flux. At the same time there are two advantages: the circuit of the permanent magnet is well closed and hence the magnet is not liable to demagnetisation; the signal is roughly proportional to the variation of the reluctance due to passage of the teeth of the toothed wheel past the magnet. This substantially eliminates the disadvantages described above of known systems. It should be noted that the best form for a magnet which does not have high intrinsic qualities and which is therefore economical to manufacture is that which allows the use of the largest area of the magnetic surface of the magnet.

Figure 6:
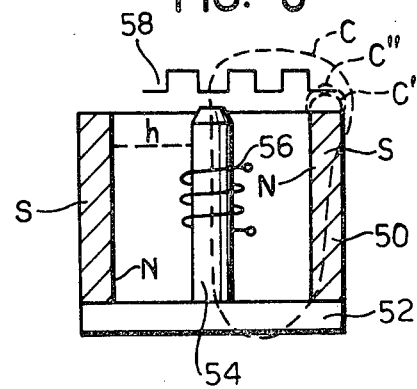
FIGS. 6 and 7 illustrate diagrammatically two different embodiments of transducer according to the invention.
Figure 7:
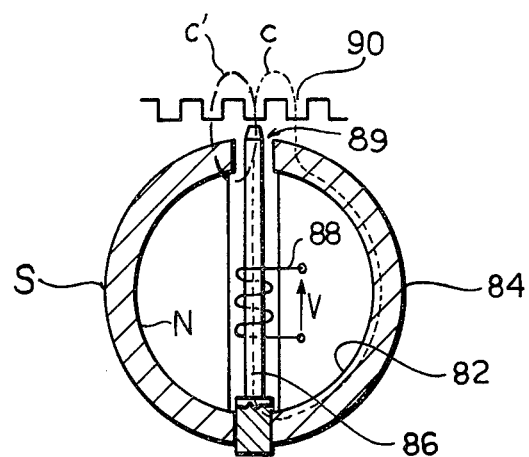

In the embodiments of FIGS. 6 and 7, which are described below, a further saving in bulk is achieved by the use of plastoferrite material for the magnet; this material also has advantageous mechanical characteristics of flexibility and light weight. Referring now to FIG. 6 there is shown a hollow cylindrical permanent magnet 50 which is magnetised radially so that the inner curved surface is wholly "North" and the outer wholly "South" or vice versa; a base 52 of ferromagnetic material closes the magnetic circuit at one end of the cylinder and adjacent the other end of the magnet 50 there is located a toothed wheel 58 of the type previously described. A ferromagnetic core 54 is housed within the magnet 50 and is connected at one end to the base 52; the other end faces the toothed wheel 58. The core 54 supports a coil 56. With this construction a large leakage flux is obtained since there is a large surface, the leakage flux is indicated in the drawing by the lines $c'$ and $c''$. Shown as $c$ is a field line which passes through the core 54 when the teeth of the wheel are appropriately positioned, thus inducing an electromotive force in the coil 56. It is to be noted that the distance $h$ is of no importance in that the induction depends upon the number of turns and the dimensions of the coil. The width of the core and the size of the teeth of the wheel should preferably be equal so that the whole magnetic flux which flows in the tooth shall also flow in the core when they are juxtaposed. The total flux should, however, be less than saturation (e.g. less than 1.5 Wb/m$^2$) for if saturation point is reached there will be no further flux variation and hence no electromotive force either.

The embodiment shown in FIG. 7 comprises a hollow spherical permanent magnet 80 magnetised radially with its inner surface 82 North and its outer surface 84 South; the magnet 80 has a hole 89 so as to permit the completion of a large number of lines of leakage flux.

A core 86 is housed within the magnet 80 with its axis coincident with a diameter of the magnet 80. One end of the core is connected to the inner surface 82. The other end of the core 86 passes through the hole 89 and projects slightly from the outer surface 84; a coil 88 is wound on the core 86.

A toothed wheel 90 magnetically interacting with the end of the core 86 and with the magnets 80, is positioned adjacent the hole 89.

The path of a line of flux through the core 86 to generate the induced electromotive force in the coil 88 is indicated by the broken line C and the path of a line of leakage flux is indicated by the broken line C'.

Figure 9:
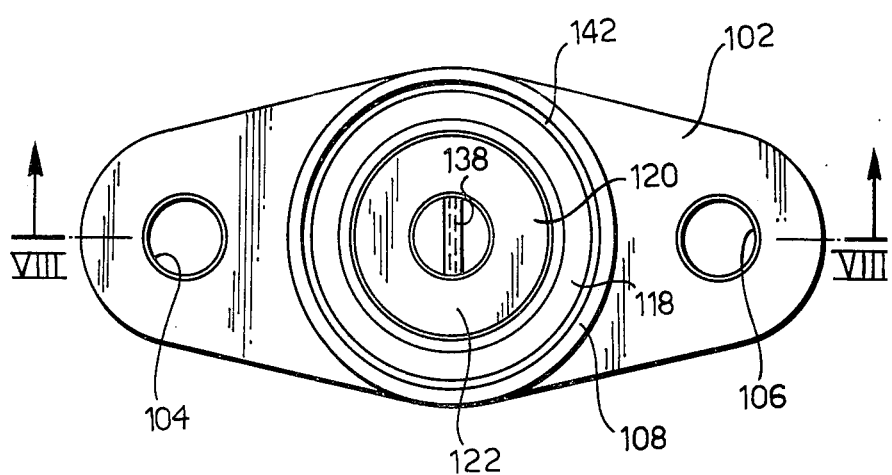
FIG. 9 is a plan view of the transducer illustrated in FIG. 8.
Figure 8:
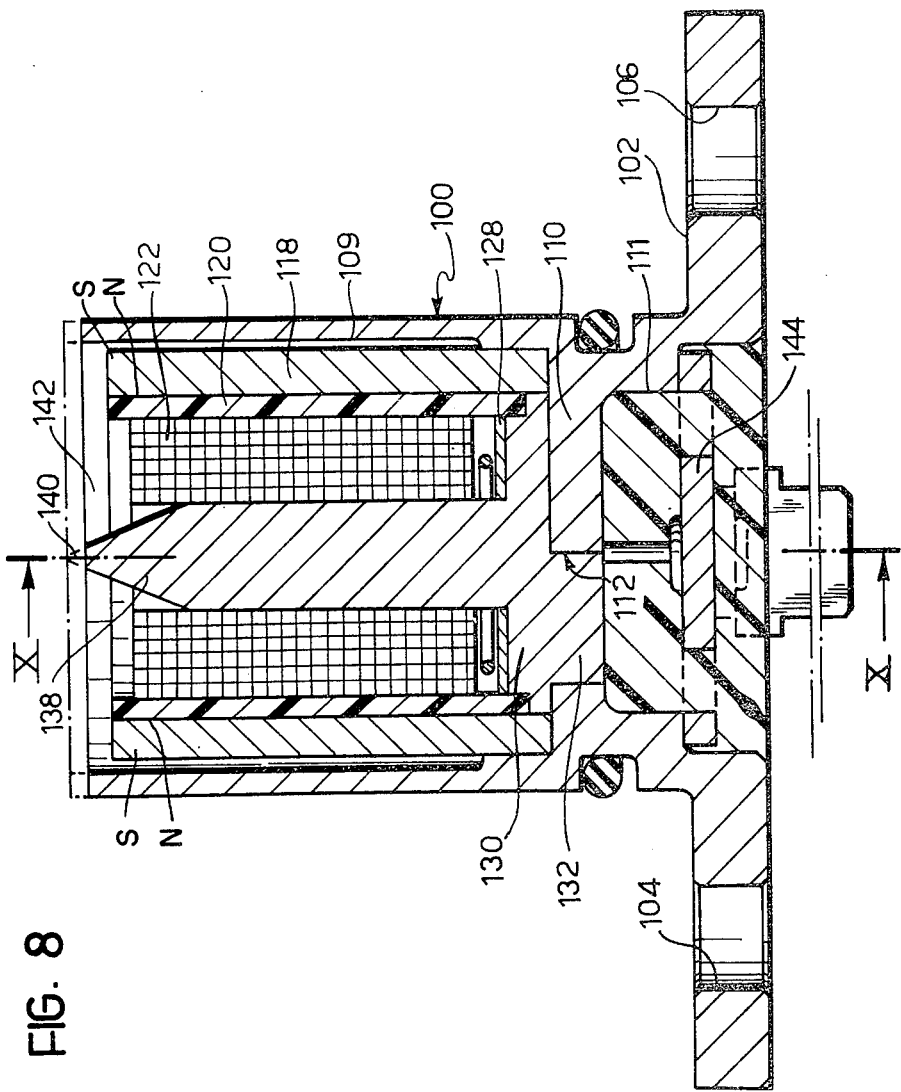
FIG. 8 is a longitudinal section through a preferred embodiment of transducer according to the invention, taken on the line VIII—VIII of FIG. 9.
Figure 10:
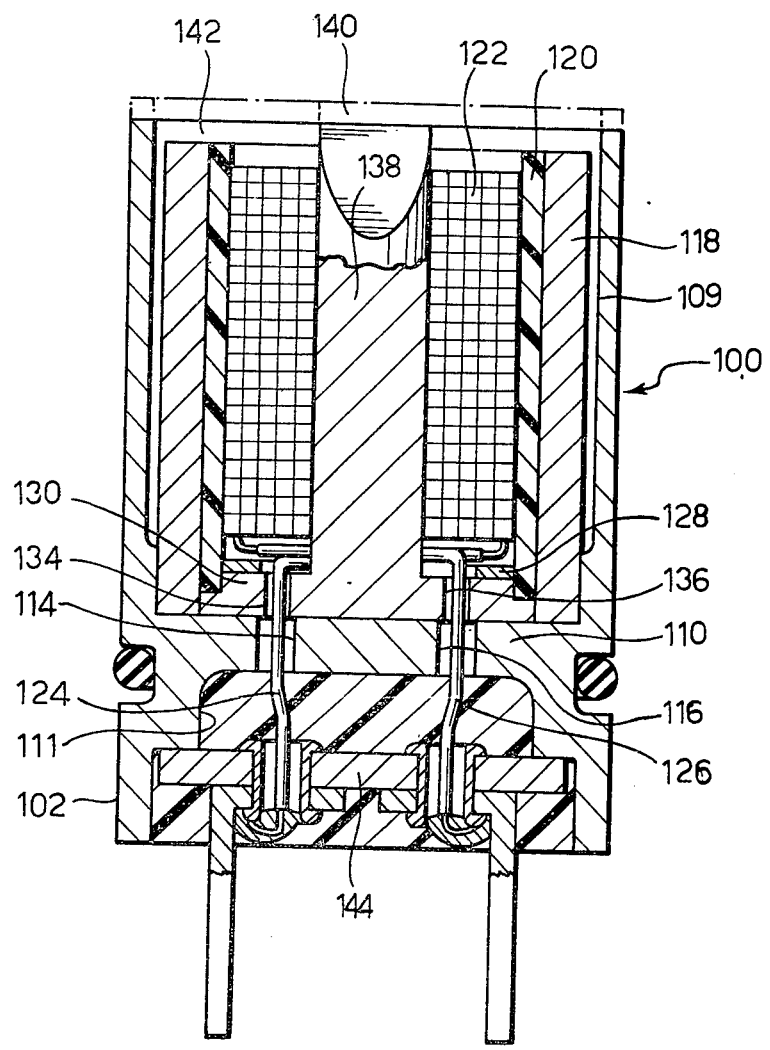
FIG. 10 is a section taken along the line X-X of FIG. 8.

Referring now to FIGS. 8, 9 and 10 the embodiment illustrated is a practical form of the embodiment illustrated in diagrammatic form in FIG. 6. The transducer is mounted in a housing 100 of ferromagnetic material which is moulded in a single piece incorporating a flanged base plate 102 having two mounting holes 104 and 106 for fixing the housing to a suitable support. In the body of the housing 100 there are two cavities 109 and 111 separated by a transverse web 110 having two holes 114 and 116 through which pass two electric leads 124, 126.

In the cavity 109 are housed the magnetic elements which interact with a toothed wheel (not shown) in the usual way. A cylindrical permanent magnet 118 of plastoferrite is housed within the cavity 109. Within the magnet 118 is located a winding 122 surrounded by a sleeve 120. The terminals of the coil 122 are the above mentioned leads 124, 126 which pass through the holes 114 and 116 in the transverse web 110.

Concentric with the magnet 118 and the coil 122 is a core of ferromagnetic material which has a base 130 with an offset axial projection 132 which fits in to an aperture 112 in the web 110. The base 130 also has two holes 134, 136 through which pass the leads 124, 126. The base 130 rests upon the transverse web 110 and the core 138 extends to project past the coil 122 and the magnet 118. The end of the core 138 has a double bevelled part 140 in the form of a chisel point. The component parts are held together by impregnation in a known way, with a resin, indicated 142, of acrylic or other type.

In the cavity 111 on the remote side of the web 110 from the cavity 109 is a terminal connector board 144 affixed with resin and serving for fixing the ends of the leads 124 and 126 and for transporting the signal from the coil to subsequent processing circuits.

Within the spirit and scope of the invention many changes and variants of form, dimensions and material from what has been specifically described, by way of example only, may be made.

I claim:

1. In an electromagnetic angular speed or position transducer of the type having means defining a permanent magnetic circuit, including a cylindrical permanent magnet means having radial magnetization with two pole faces, a toothed wheel, which is relatively rotatable with respect to said cylindrical permanent magnet means to complete a magnetic circuit when positioned adjacent said pole faces whereby relative movement between the teeth of said toothed wheel and said pole faces causes regular changes to the reluctance of said magnetic circuit;

a coil wound onto said permanent magnet means in which an electric current is induced by flux changes resulting from said changes in reluctance; the improvements comprising:

said coil is wound on a ferromagnetic core located axially within said cylindrical permanent magnet means forming part of said magnetic circuit of said permanent magnet, and said pole faces are positioned with respect to one another whereby, said magnetic circuit means and said pole faces form part of a first closed magnetic circuit which can be completed by said toothed wheel being adjacent thereto, and said core on which said coil is wound forms part of a second closed magnetic circuit which can be completed by said toothed wheel being adjacent thereto whereby both said circuits experience reluctance changes upon movement of said toothed wheel with respect to said magnetic circuit means, said first and second closed magnetic circuits being in parallel with one another.

\* \* \* \* \*